United States Patent [19]

Kauffman et al.

[11] 4,230,759
[45] Oct. 28, 1980

[54] PROCESS OF FORMING AN EMBOSSED SURFACE COVERING

[75] Inventors: William J. Kauffman, Lancaster; George L. Lilley, Manheim, both of Pa.

[73] Assignee: Armstrong Cork Company, Lancaster, Pa.

[21] Appl. No.: 932,346

[22] Filed: Aug. 9, 1978

[51] Int. Cl.³ .................... B32B 3/30; B32B 31/28
[52] U.S. Cl. ......................... 428/159; 156/78; 156/79; 156/220; 156/272; 156/277; 264/45.1; 264/51; 264/52; 264/53; 264/55; 264/132; 264/230; 264/DIG. 18; 427/35; 427/43.1; 427/44; 427/54.1; 427/261; 427/264; 427/271; 427/277; 427/340; 427/373; 204/159.2
[58] Field of Search .................. 428/158, 154, 160; 427/340, 373, 35, 43, 44, 54, 261, 264, 271, 277; 264/DIG. 18, 45.1, 55, 51, 52, 53, 132, 230; 156/78, 79, 220, 272, 277

[56] References Cited

U.S. PATENT DOCUMENTS

| | | | |
|---|---|---|---|
| 3,772,138 | 11/1973 | Witman | 428/159 |
| 4,090,007 | 5/1978 | Cranley | 428/159 |
| 4,100,318 | 7/1978 | McCann et al. | 428/159 |

FOREIGN PATENT DOCUMENTS

| | | | |
|---|---|---|---|
| 2140525 | 2/1972 | Fed. Rep. of Germany | 264/DIG. 18 |
| 2804668 | 8/1978 | Fed. Rep. of Germany | 427/373 |

*Primary Examiner*—Stanley S. Silverman
*Attorney, Agent, or Firm*—Dennis M. Kozak

[57] ABSTRACT

A process of forming an embossed surface covering is disclosed. The process comprises forming a cross-linkable foam comprising at least one polymer and having a first phase region and a second phase region; heat the foam to a temperature at least equal to the flow temperature of the first phase region; compressing the heated foam and cooling the foam while compressed; cross-linking a portion of the compressed foam; and reheating the compressed foam to permit the noncross-linked portion of the foam to return or "pop back" to substantially its precompressed shape and thus form an embossed surface covering.

10 Claims, 2 Drawing Figures

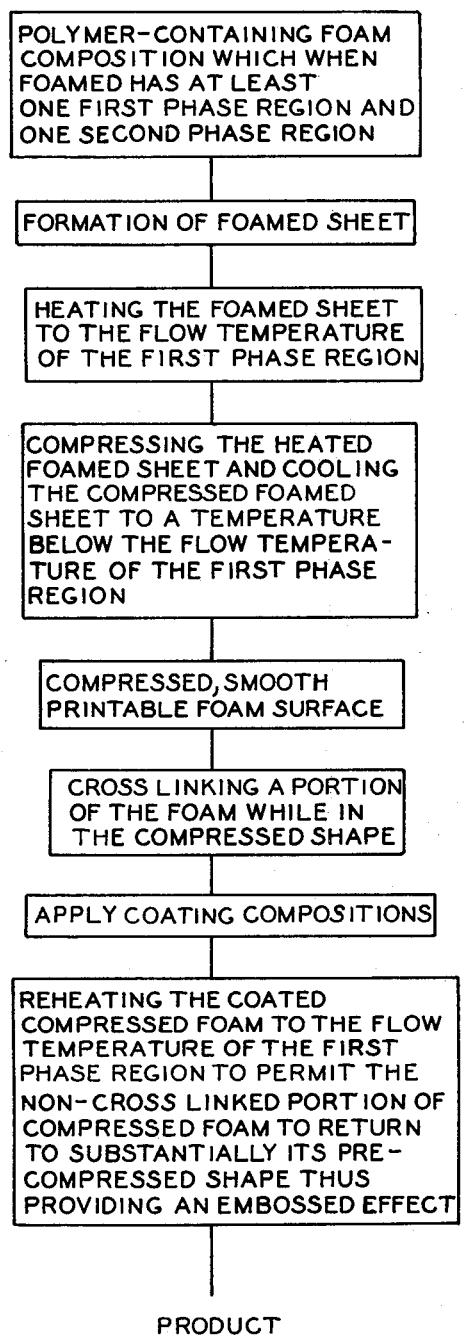
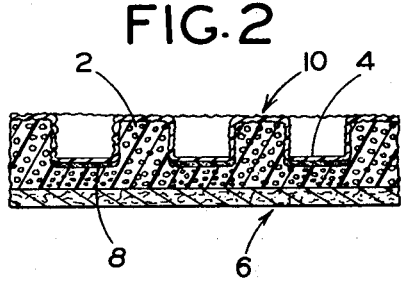

PROCESS OF FORMING AN EMBOSSED SURFACE COVERING

This invention relates to decorative surface coverings.

More specifically, this invention relates to embossed floor and wall coverings.

In one of its more specific aspects, this invention relates to a process of forming embossed decorative effects on floor and wall coverings.

The need for methods for the production of decorative effects on floor coverings, wall coverings, and the like is well known.

The present invention provides a novel process which facilitates the formation of embossed decorative effects on surface coverings, especially on resilient flooring.

According to this invention, there is provided a process of forming an embossed surface covering, which process comprises:

(a) depositing a mechanically frothed foam or forming a chemically blown foam on a backing, at least a portion of the foam being capable of being cross-linked, the foam comprising at least one polymer and having at least a first phase region and a second phase region, both phase regions existing at least in the surface region of the foam;
  (1) the first phase region exhibiting a flow temperature above room temperature and being present in the foam in an effective amount to hold the compressed shape of the foam in step (c) below,
  (2) the second phase region remaining elastomeric at the flow temperature of the first phase region;
(b) heating the foam to a temperature at least equal to the flow temperature of the first phase region;
(c) compressing the heated foam sufficient to form a level print surface and cooling the foam in the compressed shape to a temperature below the flow temperature of the first phase region such that the first phase region holds the compression of the foam upon removal of the compressing force, thus forming a level, printable, compressed foam surface;
(d) cross-linking a portion of the foam while the foam is in the compressed shape; and
(e) reheating the resulting compressed foam having a cross-linked portion to a temperature at least equal to the flow temperature of the first phase region sufficient to permit the noncross-linked portion of the compressed foam to return or "pop back" to substantially its precompressed shape.

As used herein, the term "cross-link" is understood to mean an effective increase in the molecular weight, up to and including the point of insolubility, of the foam.

As used herein, in relation to polymers, the term "flow temperature" is understood to mean that temperature associated with either crystalline melt flow or glass transition flow. To provide further understanding relating to the flow associated with crystalline melt or the flow associated with glass transition, reference is made to J. A. Brydson, *Plastic Materials,* 33–42 (1966), herein incorporated by reference.

As used herein, in relation to foams, the term "first phase region" is understood to mean all areas in the foam which exhibit the same flow temperature, as defined above.

As used herein, in relation to foams, the term "second phase region" is understood to mean all areas in the foam, which areas exhibit elasticity at the flow temperature of the first phase region, that is, these areas when subjected to deformation or strain always tend to resume their original shape after the deforming force, in this instance compression, is removed.

In one embodiment of this invention, the foam is formed by the mechanical incorporation of air into the foamable composition, and the resulting mechanically-produced (frothed) foam is deposited on a suitable backing sheet.

In another embodiment, the foam is produced by incorporating any art recognized blowing agent, e.g., azodicarbonamide, into the foamable composition, depositing the composition on a backing sheet and heating the composition to decompose the blowing agent, evolve a gas, and thus form a foam.

In the practice of this invention, any suitable method of inducing selective cross-linking, that is, cross-linking in a portion of the foam, can be employed.

In one embodiment, cross-linking is induced by exposing only a portion of the surface of the foam, while in the compressed shape, to a dosage of electron beam or ultraviolet radiation effective to cross-link the exposed portion of the foam.

In another embodiment, cross-linking is induced by applying, using any conventional method, a photosensitizer which aids in the cross-linking reaction to a portion of the surface of the foam, allowing the photosensitizer to migrate into the foam structure and exposing the surface of the foam to a dosage of ultraviolet radiation sufficient to cross-link the photosensitizer coated portion of the foam. In the practice of this invention, it is preferred that the photosensitizer be applied to the foam surface after the foam is subjected to the compressing and cooling step (c). However, as an alternative, the photosensitizer can be applied to the foam before the foam is compressed, being applied just prior to heating step (b).

In another embodiment, cross-linking is induced by applying a cross-linking catalyst, which catalyst will initiate cross-linking of the foam at or above room temperature but below the flow temperature of the first phase region of the foam, to a portion of the surface of the compressed foam. The foam is allowed to set and/or is heated to a temperature sufficient to cross-link the catalyst coated portion of the foam, but insufficient to permit the noncross-linked portion of the compressed foam to "pop back." In the practice of this invention, it is preferred that the catalyst be applied to the foam after the foam is subjected to the compressing and cooling step (c). However, as an alternative, the cross-linking catalyst can be applied to the foam before the foam is compressed, being applied just prior to heating step (b).

The foamable compositions suitable for use in this invention will comprise at least one foamable polymer or polymer blend selected such that the resulting foam exhibits at least a first and a second phase region, the first phase region exhibiting a flow temperature above room temperature and a second phase region remaining elastomeric at the flow temperature of the first phase region.

One method for determining usable polymers or polymer blends, that is, polymer or polymer blends having the necessary phase regions, is to prepare a foam of the selected polymer-containing foamable composition and then run a dynamic mechanical property analysis of the foam to obtain a graph of modulus versus temperature using, for example, a Model DV2 "Rheovibron" available from Toyo Measurement Industries, Inc. One skilled in art, by studying the resulting graph, will be able to determine if the foam comprises a region which exhibits a flow temperature above room temperature (first phase region) and a region which would remain elastomeric at the flow temperature of the first phase region (second phase region). Accordingly, by following the above method, one skilled in the art could readily determine whether a particular polymer, polymer blend, or mixture thereof is potentially useful in the practice of this invention.

Additionally, it is critical to the practice of this invention that the first phase region be present in the foam in an amount effective to hold the compressed shape of the foam upon removal of the compressive force in compressing and cooling step (c). It is believed that the first phase region of the foam, when the foam is heated to or above the flow temperature of the first phase region, flows. And, upon subsequent compressing and then cooling below the flow temperature of the first phase region, the flow stops and the first phase region serves to lock or hold the compressed foam shape upon the removal of the compressive force. Accordingly, the only positive way known to determine whether a foamed polymer-containing composition contains a sufficient amount of first phase region so as to be suitable for use in this invention is to heat the foam to or above the flow temperature of the first phase region, compress the heated foam, cool the foam while in the compressed shape, remove the compressive force and observe the resulting compressed foam to see if the compressed shape is held.

Polymers or blends of polymers which have been found to be particularly suitable for use include poly(vinyl chloride) homopolymers; poly(vinyl chloride) copolymers; blends of poly(vinyl chloride) homopolymers and copolymers; blends of two styrene-butadiene rubber latexes, one SBR selected to provide a phase region exhibiting a flow temperature above room temperature and one SBR selected to provide a phase region which remains elastomeric at the flow temperature of the phase region of the other SBR; blends of two acrylic latexes selected in accordance with the above procedure for selecting SBR latexes; and blends of poly(vinyl chloride) polymers, vinyl acetate polymers, acrylic latexes, SBR latexes, and the like, selected according to the methods set forth above.

The foamable compositions usable in this invention will also comprise an ingredient(s) which will facilitate cross-linking in a portion of the foam by use of conventional methods, for example, actinic radiation (ultraviolet light, high energy electron beam, etc.), acid or base catalyzed chemical cross-linking, and the like.

One such ingredient which can be employed in the foamable composition to facilitate cross-linking is a polyfunctional reactive monomer.

Any suitable polyfunctional reactive monomer can be employed and, if employed, will be present in an amount of from about 8 to about 100 parts per 100 parts by weight of the total polymer content of the foamable composition.

Suitable polyfunctional reactive monomers include polyfunctional melamine-formaldehyde resins, polyfunctional urea-formaldehyde resins, and polyfunctional olefins, for example, polyfunctional methylmethacrylate esters, and the like.

A particularly suitable monomer is trimethylolpropanetrimethacrylate, designated "SR-350," commercially available from Sartomer Co., a division of Sartomer Industries.

It is to be understood that, alternatively, the polyfunctional reactive monomer can be superimposed on the foam surface and allowed to migrate into the foam rather than being incorporated by mixing directly into the foamable composition. Both methods of incorporation of the polyfunctional reactive monomer serve to chemically modify the foam and make it cross-linkable.

If the polymer or polymer blend selected comprises a polyfunctional reactive polymer which contains sufficient functionality to cross-link, it is not necessary to add additional ingredients to the foamable composition in order to facilitate cross-linking. However, if the polymer or polymer blend does not comprise a polyfunctional reactive polymer, a polyfunctional polymer can be incorporated into the foamable composition as an additional ingredient to facilitate cross-linking.

Any suitable polyfunctional reactive polymer can be employed and, if employed, will be present in an amount of from about 8 to 100 parts per 100 parts by weight of the total polymer content of the foamable composition. It is to be understood that the total polymer content of the foamable composition can be a polyfunctional reactive polymer selected according to the selection methods set forth above.

Suitable polyfunctional reactive polymers which contain sufficient functionality to cross-link include copolymers of styrene and butadiene, maleic acid polyesters, and the like.

If the foamable composition contains a blowing agent, the blowing agent will be employed in an amount within the range of from about 0.5 to about 10 parts per 100 parts of polymer.

Any suitable blowing agent can be employed. A particularly suitable blowing agent is azodicarbonamide.

Optionally, the foamable compositions can also contain a plasticizer for the polymer, a heat and/or light stabilizer, a surfactant, and the like.

In its preferred form, the foamable composition will contain at least one plasticizer in a total amount up to about 100 parts, preferably about 40 to about 60 parts, per 100 parts of polymer.

Any suitable plasticizer can be employed. A particularly suitable plasticizer is dioctyl phthalate.

In its preferred form, the foamable composition will contain at least one heat and/or light stabilizer in a total amount up to about 5 parts, preferably about 1 to about 3 parts, per 100 parts of polymer.

Any suitable heat and/or light stabilizer can be employed. Suitable stabilizers are organo tin compounds. A particularly suitable organo tin compound [dibutyl tin bis(alkyl maleate)] is designated "Mark 275," commercially available from Argus Chemical Company.

In its preferred form, the foamable composition will contain at least one surfactant in a total amount up to about 10 parts, preferably 1 to 8 parts, per 100 parts of polymer.

Any suitable surfactant can be employed. Particularly suitable for use are two resinous dimethyl silicates designated "Dow-Corning 1250 Silicon Surfactant" and "Dow-Corning 1252 Silicone Surfactant," both commercially available from Dow-Corning Corporation.

If the foams of this invention are to undergo chemical cross-linking as compared to radiation induced cross-linking, any suitable acid or base cross-linking catalyst can be employed, being employed in art-recognized amounts effective to result in chemical cross-linking upon setting at room temperature and/or the subsequent application of heat. If desired, the catalyst can even be incorporated as an ingredient in a printing ink composition which can be conventionally applied. For example, the catalyst-containing ink composition can be rotogravure printed, even transfer printed.

Suitable cross-linking catalysts include oxalic acid, sulfonic acid, benzyl-trimethyl ammonium methoxide, sodium methoxide, sodium ethylate, and the like.

Optionally, if the cross-linking reaction is to be induced using ultraviolet radiation, it is preferred that an effective amount of a photosensitizer be applied to the foam surface, being applied either by separate application or in combination with a coating composition, for example, as an ingredient in a printing ink composition.

Suitable photosensitizers are well known, are employed in accordance with well known practices of the prior art, and include benzo phenone, benzoin isobutyl ether, benzoin ethyl ether, and the like. The amount of photosensitizer employed is one sufficient to promote or aid, and thus reduce the dosage of ultraviolet radiation needed to induce cross-linking.

To prepare an embossed surface covering according to this invention, a foam as described above is formed to any desired thickness on any backing sheet conventionally used in the industry (for example an asbestos backing) using any conventional method of foam application, for example, a blade over roll or reverse roll applicator, if a mechanically frothed foam is employed.

The foam is then heated, using any conventional method, such as an oven, to a temperature at least equal to the flow temperature of the first phase region.

Optionally, at this point, if either a photosensitizer for ultraviolet radiation-induced cross-linking or cross-linking catalyst for chemical cross-linking is to be employed, the photosensitizer or catalyst can be applied to at least a portion of the foam surface using any conventional means of application and allowed to migrate into the portion of the foam corresponding to the application.

Next, the foam is compressed to a higher density, forming an excellent print surface, cooled in the compressed shape to a temperature below the flow temperature of the first phase region, and the compressing force removed. Any conventional compressing and cooling apparatus can be employed. A particularly suitable apparatus for use in a smooth surface, steel roll laminator equipped with a water circulating cooling system.

If either the photosensitizer or cross-linking catalyst are to be employed and have not yet been applied, they are applied at this point using conventional coating methods. Alternatively, the photosensitizer or cross-linking catalyst can be incorporated into a printing ink composition, which composition can be conventionally printed (e.g., rotogravure, transfer, and the like) on the foam surface.

Next, the compressed foam is cross-linked in selected portions or areas. Cross-linking can be induced by printing a cross-linking catalyst on a portion of the surface of the foam or by passing the compressed foam sheet under any conventional ultraviolet irradiator or electron beam irradiator, which irradiator can be masked or screened using any conventional screening means to facilitate selective exposure and thus cross-linking in the exposed portions of the foam. It is to be understood that the employment of a photosensitizer eliminates the need to screen ultraviolet radiation to achieve selective cross-linked areas.

Optionally, at this point, the compressed cross-linked foam surface can be top coated with any conventional coating using any conventional method of application. For example, a decorative design using an ink composition can be rotogravure printed on the surface and, alternatively or in addition to printing ink compositions, the entire surface can be clear coated with an art recognized wear layer composition, which typically comprises a poly(vinyl chloride) plastisol.

From the above description, it will now be evident to one skilled in the art that the process of this invention will facilitate in-register printing and embossing, for example, if a portion of the foam has been cross-linked, ink compositions can be printed in-register with the cross-linked portion of the foam using conventional and well known printing methods or if a cross-linking catalyst is employed as an ingredient in a printing ink composition, in-register printing and embossing is inherent.

The resulting compressed foam is then subjected to reheating, using any conventional methods, at a temperature at least equal to the flow temperature of the first phase region which reheating permits the noncross-linked portion of the compressed foam to "pop back." To avoid a second heating to cure the wear layer composition (if employed), a reheating temperature sufficient to cure the wear layer composition can be selected.

Further, it is to be understood that if chemical cross-linking is employed, the cross-linking reaction must take place at a temperature between room temperature and below the flow temperature of the first phase region. Accordingly, the reheating step (f) can be modified by first raising the temperature of the foam in order to aid in the cross-linking reaction and thus cross-link the catalyst coated portions of the foam, and then further increasing the temperature of the foam to at least the flow temperature of the first phase region to "pop back" the noncross-linked portion of the foam.

Upon cooling, the resulting product is recoverable as a surface covering having a decorative embossed effect.

The present invention will be more easily understood by referring to the following drawing in which FIG. 1 is a flow diagram illustrating the process of the present invention and FIG. 2 is an enlarged simplified cross-sectional view of an embossed surface covering of this invention.

Referring now to FIG. 2, the embossed surface covering comprises a raised cellular noncross-linked portion 2 and depressed cross-linked portion 4 on backing 6. Print coat 8 is in register with the depressed cross-linked portion and clear coat 10 serves as a wear resistant layer for the embossed surface covering.

Having described the materials and methods of the invention, reference is now made to the following examples which set forth the best mode contemplated for practicing the invention.

EXAMPLE I

This example demonstrates the preparation of an embossed surface covering wherein the cross-linking is induced by ultraviolet radiation. The following materials were employed in the foamable composition.

| Materials | Parts per 100 Parts of Resin |
|---|---|
| polyvinyl chloride resin (dispersion grade Mn 60,700) | 80 |
| polyvinyl chloride resin (blending grade Mn 36,500) | 20 |
| di-2-ethylhexyl phthalate | 30 |
| Trimethylolpropane-trimethacrylate ("SR-350") | 20 |
| organo tin stabilizer ("Mark 275") | 2 |
| texanol isobutyrate (plasticizer) | 10 |
| octyl, epoxy tallate ("Drapex 4-4" available from Argus Chemicals Co.) | 2 |
| silicone surfactant ("GE-4254" available from General Electric Silicone, Div. of General Electric) | 4 |

The total amounts of the above materials were placed in an Oakes foamer and mechanically frothed.

The resulting frothed foam was deposited on a beater-saturated asbestos backing to a thickness of about 0.05 inch using a knife applicator.

The backing having the foam deposited thereon was then heated to a temperature of about 275° F. for a period of about 15 minutes, tested and found to have a foam density of about 30 lbs/ft³.

The heated foam was then compressed about 0.02 inch in a flat bed press at a temperature of about 275° F. and cooled while in the compressed shape to a temperature of about 100° F. before disengaging the press.

The resulting compressed foam was tested and found to have a foam density of about 50 lbs/ft³ and observed to have a level, uniformly compressed, smooth, printable surface.

Next, the printable surface was selectively rotogravure printed with an ink composition comprising in parts per 100 parts of composition about 18 parts poly(vinyl chloride) binder resin (Mn 20,700), about 36 parts methylethyl ketone, about 36 parts methyl isobutyl ketone, and about 10 parts of photosensitizer (benzoinisobutyl ether).

The selectively rotogravure printed, compressed foam was aged at room temperature for about 24 hours, at which point a 0.05 inch thick "Surlyn" film, commercially available from E. I. DuPont, was placed on the surface of the compressed foam to serve as the wear layer.

The resulting composite was then passed under an ultraviolet irradiator equipped with a 200 watt/in² medium pressure mercury arc lamp, commercially available from Radiation Polymer Corporation.

The "Surlyn" film coated foam surface was exposed to the ultraviolet irradiator at a rate corresponding to a dosage of about 8.0 joules/cm², which dosage was sufficient to cross-link the photosensitizer-containing ink printed portions of the compressed foam.

The cross-linked compressed foam was then reheated to a temperature of about 275° F. for a period of about 2 minutes to permit the noncross-linked portions of the compressed foam surface to return or "pop back" to substantially their precompressed shape and density.

The resulting product was recovered as a decorative embossed-in-register floor covering, observed to have an excellent print image, found to have a foam density of about 30 lbs/ft³ in the noncross-linked portions, and found to exhibit a 0.017 inch differential in embossing between the cross-linked and noncross-linked portions.

EXAMPLE II

This example demonstrates the preparation of an embossed surface covering in which the cross-linking is induced by electron beam radiation. The following materials were employed in the foamable composition.

| Materials | Parts per 100 Parts of Resin |
|---|---|
| polyvinyl chloride resin (dispersion grade Mn 60,700) | 80 |
| polyvinyl chloride resin (blending grade Mn 36,500) | 20 |
| di-2-ethylhexyl phthalate | 50 |
| Trimethylolpropane-trimethacrylate ("SR-350") | 20 |
| organo tin stabilizer ("Mark 275") | 2 |
| texanol isobutyrate (plasticizer) | 10 |
| octyl, epoxy tallate ("Drapex 4-4" available from Argus Chemical Co.) | 2 |
| silicone surfactant ("GE-4254" available from General Electric Silicone, Div. of General Electric) | 4 |

The total amounts of the above materials were placed in an Oakes foamer and mechanically frothed.

The resulting frothed foam was deposited on a beater-saturated asbestos backing to a thickness of about 0.05 inch using a knife applicator.

The backing having the foam deposited thereon was then heated to a temperature of about 275° F. for a period of about 15 minutes, tested and found to have a foam density of about 30 lbs/ft³.

The heated foam was then compressed about 0.02 inch in a flat bed press at a temperature of about 275° F. and cooled while in the compressed shape to a temperature of about 100° F. before disengaging the press.

The resulting compressed foam was tested and found to have a foam density of about 50 lbs/ft³ and observed to have a uniformly compressed, level, print surface.

The resulting compressed foam was then passed under an electron beam source masked with a ⅛ inch thick steel plate and the exposed portion of foam subjected to a 5 megarad dosage, which dosage was sufficient to cross-link the exposed portion of the compressed foam.

Next the selectively cross-linked, compressed foam surface was wear layer coated with a PVC plastisol using a conventional applicator to a wear layer thickness of about 0.006 inch.

The coated, compressed foam was then reheated to a temperature of about 380° F. for about 2 minutes, which was sufficient to permit the noncross-linked portions of the compressed foam surface to return to substantially their precompressed shape and density and cure the PVC plastisol wear layer coating.

The resulting product was recovered as a decorative embossed floor covering, found to have a foam density of about 30 lbs/ft³ in the noncross-linked portions, and found to exhibit a 0.019 inch differential in embossing between the cross-linked and noncross-linked portions.

EXAMPLE III

This example demonstrates the preparation of an embossed surface covering in which the cross-linking is induced by acid catalyzed chemical cross-linking. The following materials were employed in the foamable composition.

| Materials | Parts per 100 Parts of Resin |
|---|---|
| polyvinyl chloride resin (dispersion grade Mn 60,700) | 80 |
| polyvinyl chloride resin (blending grade Mn 36,500) | 20 |
| di-2-ethylhexyl phthalate | 70 |
| melamine/formaldehyde resin ("Cymel 303" available from Union Carbide) | 20 |
| texanol isobutyrate | 8 |
| octyl, epoxy tallate ("Drapex 4-4") | 2 |
| organo tin stabilizer ("Mark 275") | 2 |
| silicone surfactant ("DC-1250" available from Dow Corning) | 8 |

The total amounts of the above materials were placed in an Oakes foamer and mechanically frothed.

The resulting frothed foam was deposited on a beater-saturated asbestos backing to a thickness of about 0.06 inch using a knife applicator.

The backing having the foam deposited thereon was then heated to a temperature of about 275° F. for a period of about 10 minutes, tested and found to have a foam density of about 28 lbs/ft$^3$.

The heated foam was then compressed about 0.025 inch in a flat bed press at a temperture of about 220° F. and cooled while in the compressed shape to a temperature of about 100° F. before disengaging the press.

The resulting compressed foam was tested and found to have a foam density of about 48 lbs/ft$^3$ and observed to have a uniformly compressed, level print surface.

Next, the printable surface was selectively rotogravure printed with an ink composition comprising in parts per 100 parts of ink composition about 20 parts poly(vinyl chloride) binder resin (Mn 20,700), about 10 parts cross-linking catalyst (oxalic acid), 51 parts of nitropropane, 12 parts of isopropyl acetate, and 7 parts of diacetone alcohol.

The resulting printed, compressed foam was aged for about 7 days at room temperature and then the resulting cross-linked, compressed foam was heated at a temperature of about 250° F. for a period of about 2 minutes to permit the noncross-linked (nonprinted) portion of the foam to return to substantially its precompressed shape and density.

The resulting product was recovered as a decorative embossed-in-register wall covering (which can be employed as a floor covering if a conventional wear layer coating is added), observed to have an excellent print image, found to have a foam density of about 28 lbs/ft$^3$ in the noncross-linked portion, and found to exhibit a 0.007 inch differential in embossing between the cross-linked and noncross-linked portions.

What is claimed is:

1. A process of forming an embossed surface covering, which process comprises:
    (a) depositing a mechanically frothed foam or forming a chemically blown foam on a backing, at least a portion of said foam being capable of being cross-linked, the foam comprising at least one polymer and having at least a first phase region and a second phase region, both phase regions existing at least in the surface region of said foam;
        (1) the first phase region exhibiting a flow temperature above room temperature and being present in the foam in an effective amount to hold the compressed shape of the foam in step (c) below,
        (2) the second phase region remaining elastomeric at the flow temperature of the first phase region,
    (b) heating the foam to a temperature at least equal to the flow temperature of the first phase region;
    (c) compressing the heated foam sufficient to form a level print surface and cooling the foam in the compressed shape to a temperature below the flow temperature of the first phase region such that the first phase region holds the compression of the foam upon removal of the compressing force, thus forming a level, printable, compressed foam surface;
    (d) cross-linking a portion of the foam while the foam is in the compressed shape; and
    (e) reheating the resulting compressed foam to a temperature at least equal to the flow temprature of the first phase region to permit the noncross-linked portion of the compressed foam to return to substantially its precompressed shape.

2. The process of claim 1 in which said cross-linking step (d) comprises exposing a portion of the surface of the foam, while in the compressed shape, to a dosage of electron beam radiation effective to cross-link the exposed portion of the foam.

3. The process of claim 1 in which said cross-linking step (d) comprises exposing a portion of the surface of the foam, while in the compressed shape, to a dosage of ultraviolet radiation effective to cross-link the exposed portion of the foam.

4. The process of claim 1 which comprises applying a photosensitizer to a portion of the surface of the foam, said photosensitizer being applied after the compressing and cooling step (c) and before cross-linking step (d), said cross-linking step (d) comprising exposing the surface of the foam to a dosage of ultraviolet radiation effective to cross-link the photosensitizer applied portion of the foam.

5. The process of claim 1 which comprises applying a printing ink composition comprising a photosensitizer to a portion of the surface of the foam, said photosensitizer being applied after the compressing and cooling step (c) and before cross-linking step (d), said cross-linking step (d) comprising exposing the surface of the foam to a dosage of ultraviolet radiation effective to cross-link the composition applied portion of the foam.

6. The process of claim 1 which comprises applying a photosensitizer to a portion of the foam surface before the foam is compressed, said photosensitizer being applied after foam-forming step (a) and before heating step (b), and in which said cross-linking step (d) comprises exposing the surface of the foam to a dosage of ultraviolet radiation effective to cross-link the photosensitizer applied portion of the foam.

7. The process of claim 1 which comprises applying a cross-linking catalyst, which catalyst will initiate cross-linking of the foam at a foam temperature equal to or above room temperature but below the flow temperature of the first phase region of the foam, to a portion of the surface of the foam, said catalyst being applied after the compressing and cooling step (c), and in which said cross-linking step (d) comprises allowing the foam to set and/or heating the foam to a temperature sufficient to cross-link the catalyst applied portion of the foam.

8. The process of claim 1 which comprises applying a printing ink composition comprising a cross-linking catalyst, which catalyst will initiate cross-linking of the foam at a foam temperature equal to or above room temperature but below the flow temperature of the first phase region of the foam, to a portion of the surface of the foam, said composition being applied after the compressing and cooling step (c), and in which said cross-linking step (d) comprises allowing the foam to set and/or heating the foam to a temperature sufficient to cross-link the catalyst applied portion of the foam.

9. The process of claim 1 which comprises applying a cross-linking catalyst, which catalyst will initiate cross-linking of the foam at a foam temperature at or above room temperature but below the flow temperature of the first phase region of the foam, to a portion of the surface of the foam, said catalyst being applied after foam-forming step (a) and before heating step (b), and in which said cross-linking step (d) comprises allowing the foam to set and/or heating the foam to a foam temperature sufficient to cross-link the catalyst applied portion of the foam.

10. An embossed surface covering produced according to the process of claim 1.

* * * * *